(12) United States Patent
Sethumadhavan et al.

(10) Patent No.: US 9,916,449 B2
(45) Date of Patent: Mar. 13, 2018

(54) IDENTIFICATION OF BACKDOORS AND BACKDOOR TRIGGERS

(71) Applicants: THE TRUSTEES OF COLUMBIA UNIVERSITY IN THE CITY OF NEW YORK, New York, NY (US); Lakshminarasimhan Sethumadhavan, New York, NY (US); Adam Waksman, Pleasantville, NY (US); Matthew Suozzo, New York, NY (US)

(72) Inventors: Lakshminarasimhan Sethumadhavan, New York, NY (US); Adam Waksman, Pleasantville, NY (US); Matthew Suozzo, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 78 days.

(21) Appl. No.: 14/773,104

(22) PCT Filed: Nov. 12, 2013

(86) PCT No.: PCT/US2013/069764
§ 371 (c)(1),
(2) Date: Sep. 4, 2015

(87) PCT Pub. No.: WO2014/137416
PCT Pub. Date: Sep. 12, 2014

(65) Prior Publication Data
US 2016/0012228 A1    Jan. 14, 2016

Related U.S. Application Data

(60) Provisional application No. 61/775,394, filed on Mar. 8, 2013.

(51) Int. Cl.
*G06F 21/56* (2013.01)
*G06F 21/71* (2013.01)
(Continued)

(52) U.S. Cl.
CPC ............ *G06F 21/566* (2013.01); *G06F 21/56* (2013.01); *G06F 21/71* (2013.01); *H04L 63/1466* (2013.01); *G06F 11/263* (2013.01)

(58) Field of Classification Search
CPC ......... G06F 21/86; G06F 11/263; G06F 21/56
See application file for complete search history.

(56) References Cited

U.S. PATENT DOCUMENTS 7,779,472 B1    8/2010   Lou
8,010,998 B2    8/2011   Karstens
(Continued)

OTHER PUBLICATIONS

Jha et al., "Randomization Based Probabilistic Approach to Detect Trojan Circuits", 2008, pp. 117-124.*
(Continued)

*Primary Examiner* — Thaddeus Plecha
(74) *Attorney, Agent, or Firm* — Occhiuti & Rohlicek LLP

(57) ABSTRACT

Disclosed are devices, systems, apparatus, methods, products, media, and other implementations, including a method that includes computing for one or more inputs of a circuit associated metrics representative of degree of influence that values of each of the one or more inputs have on at least one output dependent on the one or more inputs, and determining based, at least in part, on the computed metrics associated with the one or more inputs of a more inputs whether the at least one output dependent on the one or more inputs is part of a potentially malicious implementation.

19 Claims, 9 Drawing Sheets

(51) Int. Cl.
 *H04L 29/06* (2006.01)
 *G06F 11/263* (2006.01)

(56) References Cited

U.S. PATENT DOCUMENTS

| | | | |
|---|---|---|---|
| 8,239,959 | B2 | 8/2012 | Gellerich |
| 2005/0229254 | A1 | 10/2005 | Singh et al. |
| 2005/0273858 | A1 | 12/2005 | Zadok et al. |
| 2007/0192863 | A1 | 8/2007 | Kapoor et al. |
| 2009/0044265 | A1 | 2/2009 | Ghosh et al. |
| 2009/0083845 | A1 | 3/2009 | Ormazabal et al. |
| 2012/0105099 | A1 | 5/2012 | Tanimura et al. |
| 2012/0124393 | A1 | 5/2012 | Sethumadhavan et al. |
| 2012/0260342 | A1 | 10/2012 | Dube et al. |
| 2012/0311708 | A1 | 12/2012 | Agarwal et al. |
| 2013/0061322 | A1 | 3/2013 | Sethumadhavan et al. |

OTHER PUBLICATIONS

Wolff et al., "Towards Trojan-Free Trusted ICs: Problem Analysis and Detection Scheme", 2008, pp. 1362-1365.*
Kahn, J., Kalai, G., & Linial, N. (1988). The Influence of Variables on Boolean Functions (extended abstract). 68-80. Retrieved from https://www.computer.org/csdl/proceedings/focs/1988/0877/00/021923.pdf.
United Stated Department of Defense (DoD). (2005). Defense Science Board Task Force on High Performance Microchip Supply. 118 pgs. Washington, D.C: Office of the Under Secretary of Defense for Acquisition, Technology, and Logistics.
Agrawal, D., Baktir, S., Karakoyunlu, D., Rohatgi, P., & Sunar, B. (May 2007). Trojan Detection using IC Fingerprinting. IEEE Symposium on Security and Privacy (SP '07), 296-310. IEEE. doi:10.1109/SP.2007.36.
King, S. T., Tucek, J., Cozzie, A., Grier, C., Jiang, W., & Zhou, Y. (2008). Designing and implementing malicious hardware. Proceedings of the 1st USENIX Workshop on Large-Scale Exploits and Emergent Threats (LEET), 5:1-5:8. USENIX Association. Retrieved from https://classes.soe.ucsc.edu/cmps223/Spring09/King%2008.pdf.
Adee, S. (May 2008). The Hunt for the Kill Switch. IEEE Spectrum Magazine, 45(5), 34-39. doi:10.1109/MSPEC.2008.4505310.
Banga, M., Chandrasekar, M., Fang, L., & Hsiao, M. S. (May 4, 2008). Guided Test Generation for Isolation and Detection of Embedded Trojans in ICs. GLSVLSI '08: Proceedings of the 18th ACM Great Lakes symposium on VLSI, 363-366. ACM.
Banga, M., & Hsiao, M. S. (Jun. 2008). A Region Based Approach for the Identification of Hardware Trojans. IEEE International Workshop on Hardware-Oriented Security and Trust (HOST 2008), 40-47. doi: 10.1109/HST.2008.4559047.
Li, J., & Lach, J. (Jun. 9, 2008). At-Speed Delay Characterization for IC Authentication and Trojan Horse Detection. IEEE International Workshop on Hardware-Oriented Security and Trust (HOST 2008), 8-14. doi: 10.1109/HST.2008.4559038.
Salmani, H., Tehranipoor, M., & Plusquellic, J. (Jul. 27, 2009). New Design Strategy for Improving Hardware Trojan Detection and Reducing Trojan Activation Time. IEEE International Workshop on Hardware-Oriented Security and Trust (HOST'09), 66-73. IEEE.
Hicks, M., Finnicum, M., King, S. T., Martin, M. M. K., & Smith, J. M. (May 2010). Overcoming an Untrusted Computing Base: Detecting and Removing Malicious Hardware Automatically. 2010 IEEE Symposium on Security and Privacy (SP), 159-172.
Waksman, A., & Sethumadhavan, S. (May 2010). Tamper Evident Microprocessors. Proceedings of the 31st IEEE Symposium on Security and Privacy (SP), 173-188. IEEE.
United States. Department of Commerce. National Institute of Standards and Technology (NIST). (Jun. 2010). Piloting Supply Chain Risk Management Practices for Federal Information Systems. Draft NISTIR 7622 by M. Swanson, N. Bartol, and R. Moorthy, 86 pgs.
Brown, E. (Aug. 3, 2010). New NIST Report Advises: Securing Critical Computer Systems Begins at the Beginning. 2 pgs. Retrieved from http://www.nist.gov/itl/csd/security_080310.cfm.
Moore, M. S. (Oct. 6, 2010). Building Backdoors Into Computer Chips. Pacific Standard, 2 pgs. Retrieved from http://www.psmag.com/politics-and-law/building-backdoors-into-computer-chips-23617.
Sturton, C., Hicks, M., Wagner, D., & King, S. T. (May 2011). Defeating UCI: Building Stealthy and Malicious Hardware. 2011 IEEE Symposium on Security and Privacy (SP), 64-77. doi:10.1109/SP.2011.32. Retrieved from https://spqr.eecs.umich.edu/courses/cs660sp11/papers/defeating-uci-oak11.pdf.
Waksman, A., & Sethumadhavan, S. (May 2011). Silencing Hardware Backdoors. 2011 IEEE Symposium on Security and Privacy (SP), 49-63. IEEE Doi:10.1109/SP.2011.27.
Choudhary, N. K., Wadhavkar, S. V., Shah, T. A., Mayukh, H., Gandhi, J., Dwiel, B. H., . . . & Rotenberg, E. (Jun. 4, 2011). FabScalar: Composing Synthesizable RTL Designs of Arbitrary Cores within a Canonical Superscalar Template. 2011 38th Annual International Symposium on Computer Architecture (ISCA).
Reece, T., Limbrick, D. B., Wang, X., Kiddie, B. T., & Robinson, W. H. (Sep. 30, 2012). Stealth Assessment of Hardware Trojans in a Microcontroller. 2012 IEEE 30th International Conference on Computer Design (ICCD), 139-142. IEEE. Doi: 10.1109/ICCD.
Wei, S., Li, K., Koushanfar, F., & Potkonjak, M. (Nov. 2012). Provably Complete Hardware Trojan Detection Using Test Point Insertion. 2012 IEEE/ACM International Conference on Computer-Aided Design (ICCAD), 569-576. IEEE Retrieved from http://web.cs.ucla.edu/~miodrag/papers/Wei_ICCAD_2012.pdf.
Waksman, A., Sethumadhavan, S., & Eum, J. (Apr. 2013). Practical, Lightweight Secure Inclusion of Third-Party Intellectual Property. IEEE Design & Test, 30(2), 8-16. doi:10.1109/MDT.2013.2247458.
Waksman, A., Suozzo, M., & Sethumadhavan, S. (Nov. 4, 2013). FANCI: Identification of Stealthy Malicious Logic Using Boolean Functional Analysis. Proceedings of the 20th ACM Conference on Computer & Communications Security (CCS), 697-708. ACM. Doi:10.1145/2508859.2516654.
International Search Report & Written Opinion of the International Search Authority (US) dated Apr. 15, 2014, for International Application No. PCT/US2013/069764, 9 pgs.
International Preliminary Report on Patentability for International Application No. PCT/US2013/069764, dated Sep. 8, 2015, 8 pgs.

* cited by examiner

IDENTIFICATION OF BACKDOORS AND BACKDOOR TRIGGERS

CROSS-REFERENCE TO RELATED APPLICATIONS

This application claims the benefit of, and priority to, International Application No. PCT/US2013/069764, entitled "IDENTIFICATION OF BACKDOORS AND BACKDOOR TRIGGERS," and filed Nov. 12, 2013, which claims the benefit of, and priority to, provisional U.S. application Ser. No. 61/775,394, entitled "SYSTEMS AND METHODS TO IDENTIFY BACKDOOR AND BACKDOOR TRIGGERS," and filed Mar. 8, 2013, the contents of all of which are incorporated herein by reference in their entireties.

STATEMENT REGARDING FEDERALLY SPONSORED RESEARCH

This invention was made with government support under grant No. 1054844 awarded by the National Science Foundation (NSF), and under a National Defense Science & Engineering Graduate (NDSEG) fellowship awarded by the Department of Defense. In addition, the invention was also made with the following government support: Grant Number FA 8750-10-2-0253 awarded by the Air Force Research Laboratory (AFRL/IF); Grant Number FA8650-11-C-7190 awarded by the Air Force Material Command (AFMCLO/JAZ); and, Grant Number FA9550-09-1-0389 awarded by the United States Air Force/Air Force Office of Scientific Research (USAF/AFOSR). The government has certain rights in the invention.

BACKGROUND

Malicious backdoors and intentional security flaws in hardware designs pose a threat to trusted computing. A designer can hide a backdoor within a hardware design by including a circuit design (e.g., through inclusion of a few lines of malicious code, out of potentially millions, representing circuit designs) in a way that slightly deviates from specification. For instance, a hardware backdoor, when triggered, might turn off the page protections for a certain range of addresses. Such backdoors can be inserted either by third-party designers producing independent components or by rogue insiders.

SUMMARY

The devices, systems, apparatus, methods, products, media, and other implementations described herein include a method including computing for one or more inputs of a circuit associated metrics representative of degree of influence that values of each of the one or more inputs have on at least one output dependent on the one or more inputs, and determining based, at least in part, on the computed metrics associated with the one or more inputs whether the at least one output dependent on the one or more inputs is part of a potentially malicious implementation.

Embodiments of the method may include at least some of the features described in the present disclosure, including one or more of the following features.

Determining based, at least in part, on the computed metrics associated with the one or more inputs whether the at least one output dependent on the one or more inputs is part of a potentially malicious implementation may include identifying from the one or more inputs, from which the at least one output is dependent, at least one malicious triggering input configured to trigger malicious behavior of the potentially malicious implementation.

The potentially malicious implementation may include a potential electronic backdoor implementation.

Computing for the one or more inputs of the circuit the associated metrics may include generating a truth table for the one or more inputs and the at least one output dependent on the one or more inputs, with the truth table including at least some combinations of input values for the one or more inputs and resultant values of the at least one output dependent on the one or more inputs, and computing for at least one of the one or more inputs, based on the generated truth table, an associated at least one control value representative of a portion of rows of the truth table whose output is influenced by the at least one of the one or more inputs.

Generating the truth table may include evaluating a random-size subset of possible permutations of the input values for the one or more inputs and the resultant output values of the at least one output dependent on the one or more inputs.

Determining based, at least in part, on the computed metrics associated with the one or more inputs whether the at least one output dependent on the one or more inputs is part of a potentially malicious implementation may include determining whether the at least one output dependent on the one or more inputs is part of a potentially malicious implementation based on application of one or more heuristics to the at least one control value computed from the truth table.

Determining whether the at least one output dependent on the one or more inputs is part of a potentially malicious implementation based the on the application of the one or more heuristics to the at least one control value computed from the truth table may include applying to the at least one control value one or more of, for example, a median heuristic process to select a median value from the at least one control value, a mean heuristic process to compute a mean value from the at least one control value, and/or a triviality heuristic process to compute a weighted average value from the at least one control value.

The method may further include comparing one or more resultant values respectively computed from the application of the one or more heuristics to the at least one control value to respective one or more predetermined threshold values.

The circuit may include one or more of, for example, a physical electrical circuit, a software-implemented circuit, a graphical circuit representation, and/or a coded circuit representation.

The circuit may include a circuit module of a circuit arrangement comprising multiple circuit modules.

In some variations, a system is disclosed that includes at least one controller including one or more of, for example, a processor-based device, a field programmable gate array (FPGA), an application-specific integrated circuit (ASIC), and/or a DSP processor. The controller is configured to cause operations including computing for one or more inputs of a circuit associated metrics representative of degree of influence that values of each of the one or more inputs have on at least one output dependent on the one or more inputs, and determining based, at least in part, on the computed metrics associated with the one or more inputs whether the at least one output dependent on the one or more inputs is part of a potentially malicious implementation.

Embodiments of the system may include at least some of the features described in the present disclosure, including at least some of the features described above in relation to the method.

In some variations, a computer readable media programmed with a set of instructions executable on at least one controller device is provided. The instructions, when executed, cause operations including computing for one or more inputs of a circuit associated metrics representative of degree of influence that values of each of the one or more inputs have on at least one output dependent on the one or more inputs, and determining based, at least in part, on the computed metrics associated with the one or more inputs whether the at least one output dependent on the one or more inputs is part of a potentially malicious implementation.

Embodiments of the computer readable media include at least some of the features described in the present disclosure, including at least some of the features described above in relation to the method and/or the system.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, is meant to encompass variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, is also meant to encompass variations of ±20% or ±10%, ±5%, or +0.1% from the specified value, as such variations are appropriate to in the context of the systems, devices, circuits, methods, and other implementations described herein.

As used herein, including in the claims, "or" or "and" as used in a list of items prefaced by "at least one of" or "one or more of" indicates that any combination of the listed items may be used. For example, a list of "at least one of A, B, or C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, or C" may also include AA, AAB, AAA, BB, etc.

As used herein, including in the claims, unless otherwise stated, a statement that a function, operation, or feature, is "based on" an item and/or condition means that the function, operation, function is based on the stated item and/or condition and may be based on one or more items and/or conditions in addition to the stated item and/or condition.

Details of one or more implementations are set forth in the accompanying drawings and in the description below. Further features, aspects, and advantages will become apparent from the description, the drawings, and the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
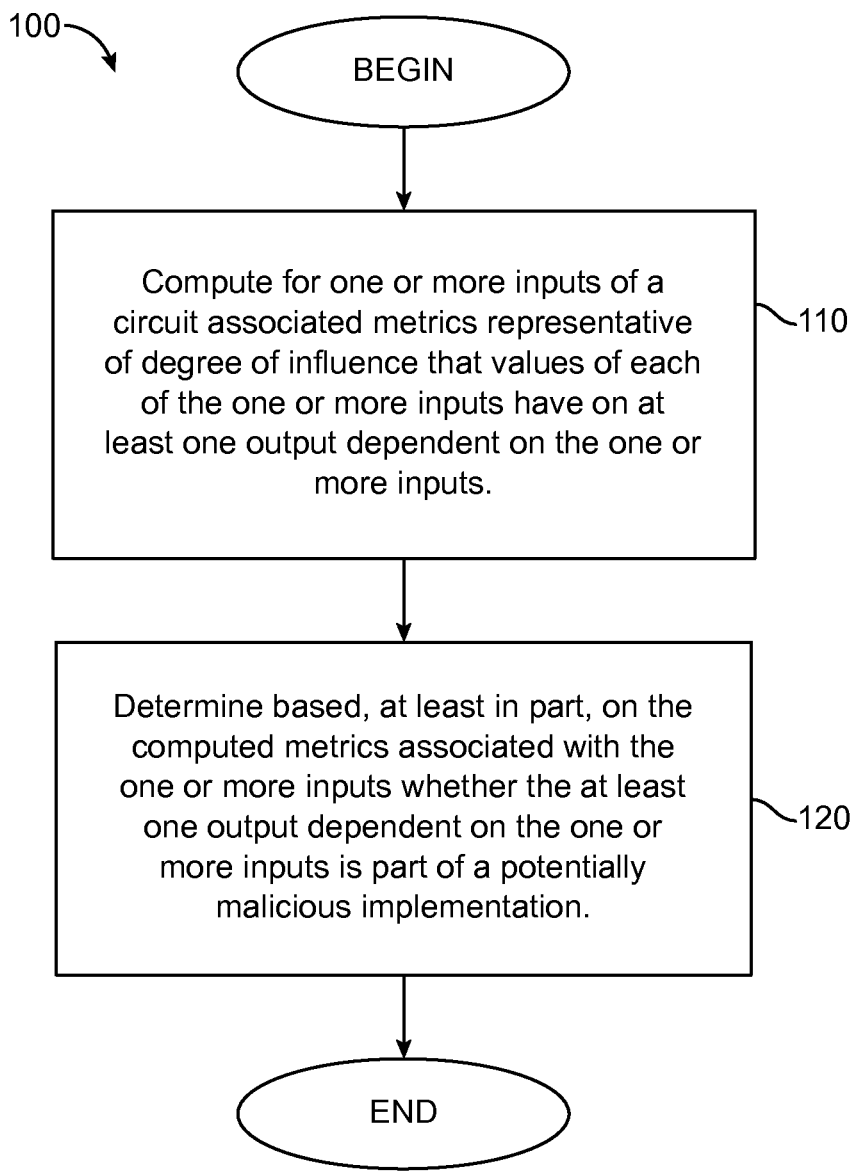
FIG. 1 is a flowchart of an example procedure to detect potential malicious circuit implementations.

Described herein are systems, devices, apparatus, computer program products, and other implementations for identification of backdoors (including stealthy hardware backdoors), and/or their triggers, using static analysis. Wires used in backdoor circuits that rarely influence the outputs of the circuit are referred to as weakly-affecting wires. The disclosure presented herein is directed to scalable approximate methods and techniques for the identification of such wires. In some embodiments, a tool referred to as Functional Analysis for Nearly-unused Circuit Identification (or FANCI), configured to flag suspicious wires of circuit implementations, is used.

The term "backdoors" generally refers to malicious modifications to hardware (e.g., by insiders, such as engineers involved in the development of the hardware, etc.) that provide a foothold into any sensitive or critical information in the system. A malicious modification, or a backdoor, can come from a core design component (e.g., a few lines of Hardware Description Language (HDL) core code can be changed to cause malicious functionality), from third-party vendors providing components (e.g., memory controllers, microcontrollers, display controllers, DSP and graphics cores, bus interfaces, network controllers, cryptographic units, and an assortment of building blocks, such as decoders, encoders, CAMs and memory blocks), etc.

Generally, backdoors implementations rely on "nearly-unused-logic," which is logic that impacts functionality of a circuit in rare circumstances. Intuitively, this occurs because backdoors need to escape design-time testing. Design-time validation tests typically confirm that nothing faulty or inaccurate happens in common cases. Thus, a rare and unlikely event or set of events has to turn on otherwise unused logic if a backdoor payload is to be achieved. This rare event is referred to as a backdoor trigger. Thus, one way to identify backdoor, or backdoor triggers, is to statically identify "weakly-affecting inputs" which are input wires that carry signals (e.g., a logical 1 or logical 0 signals) that rarely influence the outputs of circuits. One example of a circuit with weakly-affecting inputs is a large comparator. Consider a circuit that compares a 64-bit array of wires against some predetermined value (e.g., '0xcafebeefcafebeef' for the purpose of the following example). Consider a situation where the output wire takes on the value '1' only if all 64 input wires match the specified predetermined comparison value. This means that, for example, the least significant bit only matters if the 63 other bits already match. In that case, the least significant bit would make the difference between the input corresponding to '0xcafebeefcafebeee' and '0xcafebeefcafebeef', and thus the difference between a comparator output of '0' or '1'. However, in the other $2^{63}-1$ cases, that least significant bit is irrelevant. For example, it does not matter if the input is '0xaaaaaaaaaaaaaaaa' or '0xaaaaaaaaaaaaaaab'. Thus, out of the $2^{63}$ total input case pairs, there is only a single one in which that input bit matters. Accordingly, in this particular example, the least significant input wire/bit to the comparator circuit is a very weakly-affecting dependency for the output wire. In general, a wire $w_2$ is considered to have a weakly-affecting dependency of $w_1$ if in nearly all cases the value of $w_1$ does not determine the value of $w_2$.

As will be described below in greater details, to identify weakly affecting inputs, metrics (e.g., control values), representative of the degree of influence that a circuit's inputs respectively have on at least one output of the circuit, are computed. Based on these computed control values, a determination may be made whether an output that is dependent on the inputs for which the control value were derived may be part of a potentially malicious implementation (e.g., a circuit implementation that includes one or more backdoors). In some embodiments, truth tables (i.e., lists of output values resulting from various permutations of input values) for inputs and their respective outputs may be generated/derived. Based on the generated truth tables, the influence of a circuit's inputs on a circuit's outputs (corresponding to the truth table) can be determined, and nearly-unused columns (i.e., corresponding to some of the circuit's inputs) of the generated table(s) can be identified. In some embodiments, a wire $w_2$ has a weakly-affecting dependency $w_1$ when, for some threshold value $\epsilon>0$ (with $\epsilon \ll 1$), the control value of $w_1$ on $w_2$ is less than $\epsilon$.

The implementations described herein are thus used to perform a static analysis to identify which wires in a design could potentially be carrying backdoor signals. The static analysis is configured to generally identify/flag a relatively small number of wires with a relatively high level of statistical confidence that malicious functionality present in the circuit being analyzed is dependent on a subset of those identified wires. The analysis performed via the implementations described herein should minimize (or altogether avoid) false negatives (a false negative associated with this analysis would correspond to a backdoor that was not detected). While the analysis will generally yield at least some false positives, the subset of identified inputs that potentially could correspond to backdoor implementations should be small enough that a more methodical evaluation of the identified wires can feasibly be performed (e.g., through manual inspection of code or arrangement corresponding to the identified wires). In some embodiments, a wire may be considered to be suspicious (a true positive) if it is part of combinational logic used in the possible triggering of a backdoor implementation. In other words, a suspicious wire is possibly part of the circuit that produces malicious activity.

As will be discussed in greater details below, evaluation of the implementations (systems and procedures) described herein using a hardware backdoor benchmark suite called TrustHub indicated that the implementations described herein are able to flag most (and in some cases all) suspicious paths in the benchmarks that are associated with backdoor triggers and payloads. Furthermore, the implementations described herein reported low false positive rates (e.g., in some tests, fewer than ten wires out of many thousands were incorrectly reported as suspicious). The TrustHub designs/implementations with which the evaluation was performed were generally analyzed in an hour or less. Applicability beyond benchmarks could also be demonstrated by analyzing a backdoor-free, out-of-order microprocessor core.

Thus, with reference to FIG. 1, a flowchart of an example procedure 100 to detect potential malicious circuit implementations (e.g., backdoor triggers) is shown. The procedure includes computing 110, for one or more inputs of a circuit, associated metrics (e.g., control values) representative of degree of influence that values of each of the one or more inputs of the circuit have on at least one output dependent on the one or more inputs. In some embodiments, the circuit (for which metrics representative of the degree of influence each of the circuit's inputs has on an output of the circuit's) may be a portion of a module of a larger circuit (e.g., a particular portion of an integrated circuit). The circuit may be any type of circuit, including circuits including processors, circuits including combinatorial logic, etc.

As noted, in some embodiments, computing metrics for one or more inputs of the circuit that are representative of the degree of influence the respective inputs have on one or more circuit outputs may include generating/deriving a truth table for the one or more inputs and the at least one output dependent on the one or more inputs, with the truth table including at least some combinations of input values for the one or more circuit's inputs and resultant values of the at least one output dependent on the one or more inputs. In some embodiments, the metrics are control values. A control value corresponding to a particular input represents a portion of rows of the truth table whose output is influenced by the particular input. For example, in some embodiments, for a particular output of a circuit, a truth table for the inputs that produced that particular output is generated using all inputs (e.g., input wires into an electronic circuit implementation) that feed into the circuit that produces that particular output. In some embodiments, the circuit analyzed/processed is a computerized model (e.g., which has not been implemented as an actual produced physical specimen) for which a simulation may be performed to set the circuit's inputs to some or all of the possible input permutations for the circuit. In some embodiments, the truth table is generated for an actual-implemented circuit, in which case, actual inputs are caused to be asserted at the input wires of the circuits, and the values at the circuit's output(s) is then measured/probed.

Once a circuit's truth table is generated, a determination is made whether for each possible row of the truth table the column/input being examined determines/affects a particular output. This determination may be performed, in some embodiments, by iterating through the input columns of the generated truth table, and examining the output behavior of the circuit when varying the values of one particular column, while holding the values of the other columns fixed. Consider the following example of a truth table, identified as Table 1, generated for some arbitrary circuit, in which the dependency of the circuit's output, O, on input C is assessed.

TABLE 1

| Input A | Input B | Input C | Output O |
|---------|---------|---------|----------|
| 1 | 1 | 1 | 1 |
| 1 | 1 | 0 | 0 |
| 1 | 0 | 1 | 0 |

TABLE 1-continued

| Input A | Input B | Input C | Output O |
|---------|---------|---------|----------|
| 1 | 0 | 0 | 1 |
| 0 | 1 | 1 | 0 |
| 0 | 1 | 0 | 1 |
| 0 | 0 | 1 | 1 |
| 0 | 0 | 0 | 0 |

As illustrated, when input C is varied from '1' to '0' with the inputs A and B set to '1', the output O varies also from '1' to '0'. When the inputs A and B are set to respective values of '1' and '0' and the input C is varied from '1' to '0', Output O also varies (although this time from '0' to '1'). For other fixed permutations of inputs A and B, the output O varies as the value of C varies. Thus, in this example, the input C influences the value of the output O in every row. If the influence of another of the circuit's inputs on the output O was to be determined (for example, the influence of input A), the output O would be examined to see how varying the value of A between 1 and 0 for various fixed permutations of the other inputs affects the output O. For example, the rows of Table 1 for a given permutation of inputs B and C (e.g., the permutation '1' and '1') would be identified (this permutation appears in rows 1 and 5 of the table), and the behavior of the output O when input A varies from 1 to 0 would be examined. This process could then be repeated for other permutations of the inputs B and C.

Thus, based on the generated truth table, for each of at least some of the columns, a number between 0 and 1 may be computed to represents the fraction of rows of the truth table that are influenced or controlled based on the respective input columns. Because implementations of malicious backdoors often use weakly affecting inputs, control values are computed to quantify the weakness or strength of the influence/effect respective inputs have on a circuit's output(s). In some embodiments, the resultant computed fractions for the truth table's columns are then arranged as a vector to which heuristic processing, or other types of processing, may be applied to determine whether the circuit could potentially be part of a malicious circuit implementation (e.g., the output and its inputs are potentially part of a backdoor trigger).

More particularly, the control value of an input $w_1$ on an output $w_2$ may quantify how much the truth table representing the computation of $w_2$ is influenced by the column corresponding to $w_1$. As noted, the control value for $w_1$ may be a number between zero and one quantifying what fraction of the rows in the truth table for a circuit are directly influenced by $w_1$. Note that this metric is generally independent of particular inputs that are supplied to the circuit. By operating statically and looking at truth tables, the behaviors of many gates in the design of the circuit analyzed can be observed. An example process (presented as pseudo code) to compute a control value representative of the degree of influence an input $w_1$ has on a circuit's output $w_2$ is provided below.

Control Value Computation Process

```
1: count ← 0
2: c ← Column(w_1)
3: T ← TruthTable(w_2)
4: for all Rows r in T do
5:     x_0 ← Value of w_2 for c = 0
6:     x_1 ← Value of w_2 for c = 1
7:     if x_0 ≠ x_1 then
8:         count++
9:     end if
10: end for
11: result ← count/size(T)
```

As shown in lines 7 and 8 of the above example process, if it is determined that the output $w_2$ varied when the particular input $w_1$ varied, then in that situation $w_2$ was affected by the value of $w_1$, and therefore the value count is increased. After examining the effect of varying $w_1$ has on the output $w_2$ for the various permutations of the other inputs in the truth table, in some embodiments, the final cumulative value count is divided by the size of the table T (e.g., the number of rows of T) to yield a fraction between 0 and 1.

Because the sizes of truth tables can grow exponentially with the addition of inputs, in some embodiments, a possible optimization that may be implemented to compute control values is to approximate control values by evaluating a constant-sized subset of the rows in the truth table. For example, a randomly subset of the rows of a generated truth table may be chosen at runtime to reduce the number of computations that need to be made to derive control values. Selecting such a random subset can make it difficult (or even impossible) for attackers to know which rows may be chosen to identify weakly affecting inputs, thus making it hard for attackers to counter the backdoor trigger detection systems and/or procedures described herein. In some embodiments, different random subsets of rows of the generated truth table may be used for different inputs. An example process (presented as pseudo code) to compute a control value, representative of the degree of influence an input $w_1$ has on a circuit's output $w_2$, using a randomly selected subset of the rows of a truth table T is provided below.

Control Value Computation with a Randomly Selected Subset of Rows

```
1: numSamples ← N ;  [N represents the number of samples, e.g., 2^15,
                     with which control values will be computed]
2: n ← number of inputs
3: rowFraction ← numSamples/2^n
4: count ← 0
5: c ← Column(w_1)
6: T ← TruthTable(w_2)
7: for all Rows r in T do
8:     if rand( ) < rowFraction then
9:         x_0 ← Value of w_2 for c = 0
10:        x_1 ← Value of w_2 for c = 1
11:        if x_0 ≠ x_1 then
12:            count++
13:        end if
14:    end if
15: end for
16: result ← count/numSamples
```

To illustrate with an example, suppose we have a wire $w_2$ that is dependent on an input wire $w_1$. Let $w_2$ have n other dependencies. From the set of possible values for those n wires, some predetermined constant number, e.g., 10,000, may be chosen. For those 10,000 cases, $w_1$ is set to zero and then to one. For each of the 10,000 cases, a determination is made whether changing $w_1$ changes the value of $w_2$. If $w_2$ changes m times, then the approximate control value of $w_1$ on $w_2$ is m/10,000. By making random input or subset selection, the likelihood that an attacker will be able to know what part of the truth table will be explored is reduced or altogether eliminated. The hypothesis, which is supported by test results (as more particularly discussed below) is that choosing a relatively large number of inputs at random is sufficient for the weak law of large numbers to be in effect in order get a high quality approximation of control values with small statistical deviations.

Turning back to FIG. 1, having generated a truth table and computed metrics for at least one of the one or more inputs of the circuit being examined, a determination is made 120, based, at least in part, on the computed metrics associated with the at least one of the one or more inputs, whether the at least one output dependent on the one or more inputs is part of a potentially malicious implementation. As noted, in some embodiments, the determination of whether the at least one output could be part of a malicious circuit implementation (e.g., a backdoor trigger) may be performed through the implementation of one or more heuristic processes.

For the each of at least one of the outputs, the computed metrics (e.g., control values) may include a set of control values (e.g., a vector of control values) that represent how the respective each of at least one of the outputs is influenced by its various inputs. Given a vector of control values, the heuristics may, for example, take an average and determine whether or not a wire is suspicious. Having only one weakly-affecting wire or a wire that is only borderline weakly-affecting might not be sufficiently suspicious. The processes (e.g., heuristic processes) applied to the values of a vector (for a particular circuit output) can therefore take into account all of the control values in the vector to thus enable distinguishing between suspicious and non-suspicious output wires.

Figure 2:
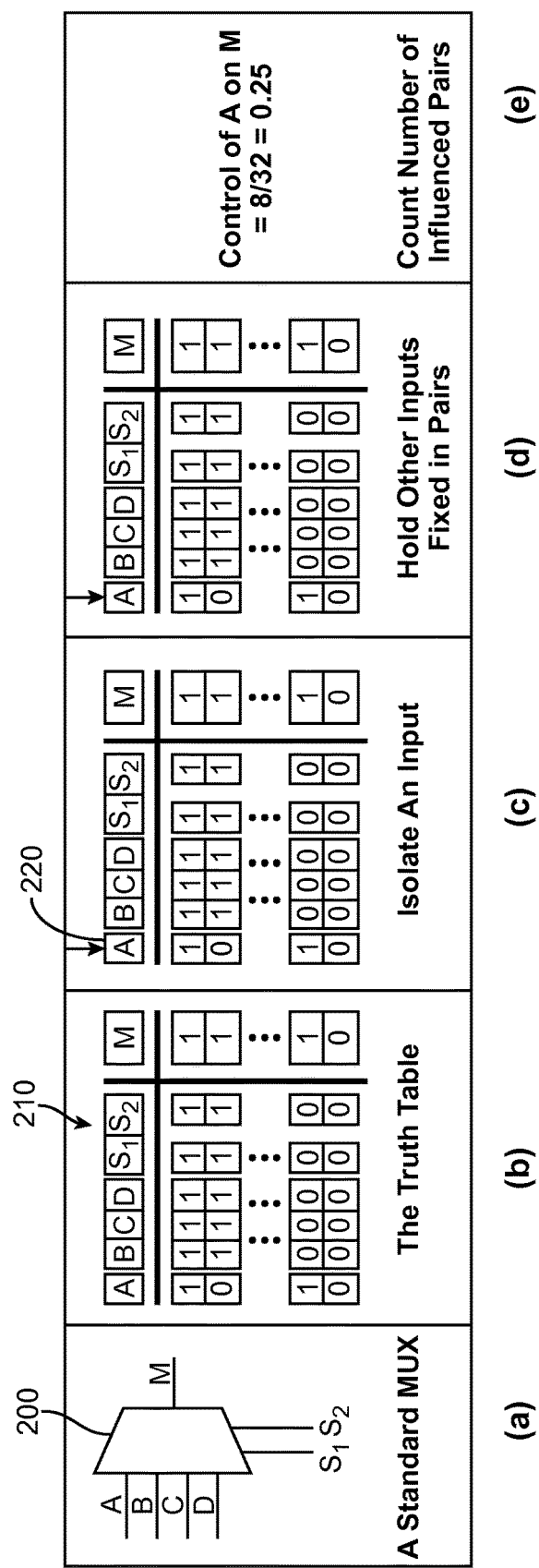
FIG. 2 is a diagram of an example circuit and an example process therefor to compute metrics representative of the degree of influence inputs of the example circuit have on the circuit's output.

Consider an example where $w_2$ is a particular circuit's output, and has a vector of n+1 control values (e.g., between 0 and 1) from its inputs ($w_1$ and the n others). These n+1 numbers are the n+1 control values from the dependencies of $w_2$. For a simple example of what these vectors can look like, consider, with reference to FIG. 2, a standard, backdoor-free multiplexer 200 (depicted in FIG. 2a) with two selection bits that are used to select between four data inputs. The output M of the multiplexer is dependent on all four data inputs and both selection bits (the selection bits choose which of the four input data values is selected). In this example, control values the multiplexer's six input wires are performed by generating a truth table 210 (shown in FIG. 2b), isolating inputs (FIG. 2c shows input A, marked as input 220, being isolated) so as to vary the input for fixed permutations formed for the other inputs (as illustrated in FIG. 2d), and computing a metric, such as a control value representative of the influence the input A has on the output of the multiplexer 200 (as shown in FIG. 2e). The situation is similar for each of the four input data wires (A, B, C and D). Because each of the inputs controls the output M (when the selection bits are set appropriately) one fourth of the cases, each of these data inputs has an associated control value 0.25. The two selection bits have higher control values. Particularly, a given selection bit chooses between two of the data values. For example, if $S_1=1$ then $S_2$ chooses between inputs B and D in the example of FIG. 2. In that case $S_2$ matters when $B \neq D$, which occurs in half of the cases. Thus, the control value for each of the two selection bits is 0.50 (this can also be determined by counting rows in the truth table for the multiplexer 200). Accordingly, the full vector of control values for the output M contains six values (one for each of the six inputs), namely, [0.25, 0.25, 0.25, 0.25, 0.50, 0.50]. Intuitively, the example multiplexer circuit depicted in FIG. 2 is a relatively benign circuit, with its inputs having values that are in the middle of the spectrum (i.e., not close to 0 and not close to 1), which is generally indicative of a common and efficient, and likely non-malicious circuit.

Figure 3:
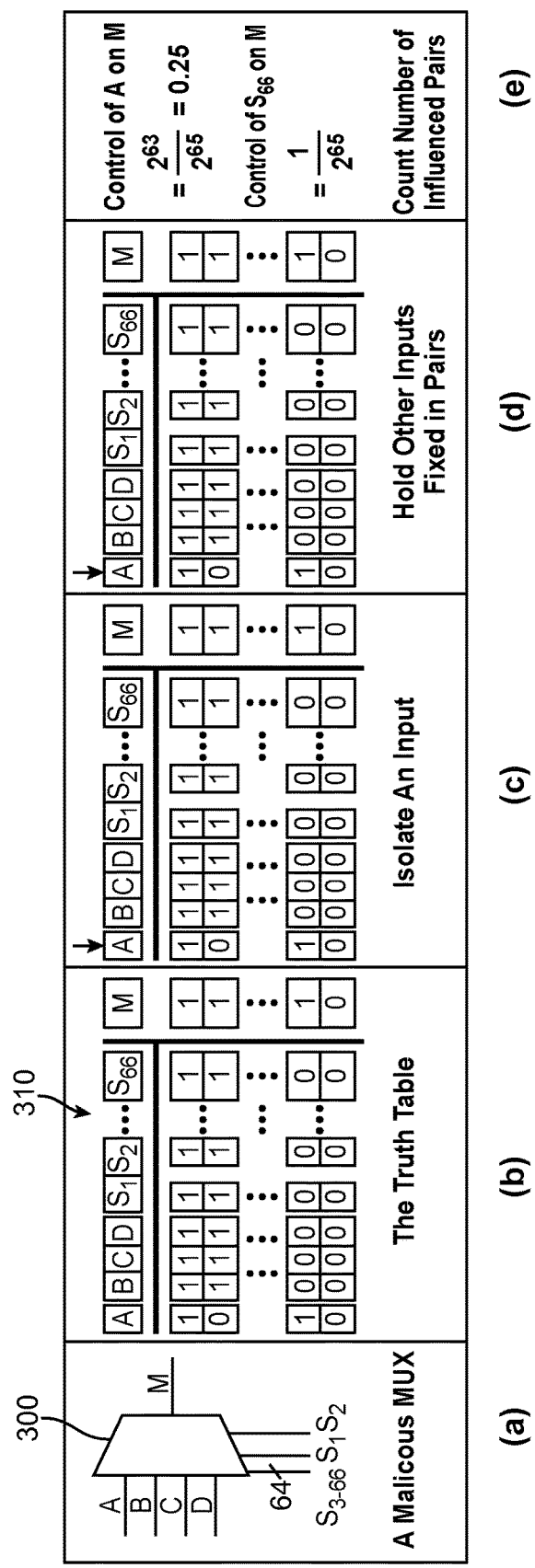
FIG. 3 is a diagram of another example circuit, and an example process therefor, to compute metrics representative of the degree of influence inputs of the example circuit have on the circuit's output.

FIG. 3 depicts a malicious version of a multiplexer 300. In the example of FIG. 3, there are four (4) input data wires (namely, A, B, C, and D) and 66 selection bits (64 more than for the multiplexer 200 of FIG. 2). When those additional 64 bits match a specific 64-bit key, the output of the multiplexer is changed to a malicious payload. In terms of the truth table (namely, a truth table 310 generated for the multiplexer 300 according to, for example, processes similar to those described herein), this affects only a small fraction of the rows. The vector of values generated for the output M would include 64 additional values for those 64 extra input wires. Each of those control value would be on the order of $2^{-63}$. Intuitively, the circuit, as indicated by its vector of control values, is a suspicious circuit.

In many situations, particularly for large/complex circuit, the distribution of control values in computed vectors is such that there may be at least a few values that are 0 or nearly 0. The challenge is to identify, based on the derived vectors of control values, the circuits (e.g., output wires) that are truly suspect from ones that are benign. There are several heuristic processes that may be applied to evaluate the computed vectors. A general example process (presented as pseudo code) to evaluate a vector of values is provided below.

| Heuristic Computation Process for an Output Wire |
|---|
| 1: w ← output wire |
| 2: h ← heuristic function [e.g., median function] |
| 3: t ← threshold (between 0 and 1) |
| 4: v(w) ← vector of control values |
| 5: result(w) ← h(v(w)) |
| 6: if result(w) < t then |
| 7:     return suspicious |
| 8: else {result(w) ≥ t} |
| 9:     return not suspicious |
| 10: end if |

Thus, in some embodiments, applying a heuristic process to the vector of control values computed/derived for a particular output of a circuit may include applying a heuristic function (e.g., such as a median function, as more particularly described below) to the derived vector of control values, and comparing the result of the heuristic function to some predetermined threshold t. When the result of the heuristic function equals or exceeds t, the output for which the control value vector was derived is deemed to be non-suspicious. When the result of the heuristic function is less than t, the output may be deemed to be a suspicious output, e.g., an output which may potentially be part of a malicious implementation, and for which further analysis is required (for example, further analysis of the behavior/operation of that flagged output and/or the inputs it depends on). In some embodiments, a determination of a suspicious output may be made when the result of the heuristic function exceeds a predetermined threshold associated with that heuristic function.

In some embodiments, an example of a heuristic that may be applied is a median heuristic in which a median value from the vector of control values is selected. The median value has the potential to be a good indicator of whether a set of dependencies is for the most part on the high end or the low end. When a circuit implementation includes one or more backdoor triggers, the wires on the critical paths of the trigger generally have mostly unaffecting or very weakly-affecting dependencies. Thus, the median value for such a circuit is often zero or very close to zero. However, the median value can be an imperfect metric when the data distribution is irregular. This does not happen often but can happen. The reason for this is that the median does not reflect the presence of a few outliers in a large set of dependencies. Using just the median may result in a few false positives.

Another heuristic that may be used, in some embodiments, is the mean heuristic in which the mean (e.g., average) of the control values is computed. Intuitively, the mean is an effective metric in the case of uniformly low dependencies or in the case where there is a heavy tail in the distribution. The mean value is generally more sensitive to outliers than is the median value. For example if there are only a few dependencies, and one of them is unaffecting, that is likely to get noticed. On the other hand, the sensitivity of the mean heuristic to outlier values may also result in this heuristic failing to differentiate between two distributions where one contains more unaffecting wires than the other.

In some embodiments, another heuristic may be one that uses both the median and mean values, e.g., flagging wires that have extreme values for both the mean and the median. A threshold for both the median and the mean is set, and a wire is flagged as suspicious when the median value is low, and the mean value is also low. This approach may help, in some cases, to diminish somewhat the number of false positives.

Another heuristic that may be used, in some embodiments, is that of triviality. Under this heuristic process, a weighted average of the values in the control value vector is determined/computed. The various control values in a vector may be weighed according to how often the respective wires associated with the control values are the only wires influencing the output to thus determine how much an output is influenced overall by its inputs. The purpose is to learn more about the output wire and less about the individual inputs. For instance, in a circuit that XORs many inputs, each input has a control value of 1.0, but any one input generally does not completely controls the output, and the triviality of the output may be lower (e.g., 0.5 in this particular example). The triviality heuristic computes the fraction of the rows in the truth table in which the dependent output wire has the value zero (or, symmetrically, the value 1). In practice, triviality may be computed directly by considering the output column. The name "triviality" refers to the fact that if the triviality value is 0 or 1 then the circuit is considers to be trivial (always outputs zero or always outputs one). The exact value for triviality can vary from run to run depending on which rows are randomly selected, but it is probabilistically likely to vary by only a small amount. Triviality may be a good metric for unusually large modules, and/or if computational runtime becomes relevant.

As noted, in some embodiments, each metric may be associated with a cut-off threshold to determine whether a circuit is suspicious or not. A metric threshold value (between zero and one) can be chosen either a priori or after looking a distribution of computed values. In practice, the latter often works better, as there are often natural breakpoints to choose as the threshold. A metric threshold is generally small, e.g., <<0.001.

Other heuristics may be used in addition to, or instead of, any one of, or any combination of, the above described heuristic processes. In some embodiments, a determination of whether an output of a circuit is considered to be suspicious may be based on some, or all, of a plurality of different heuristic functions (and/or other types of functions/processes). In some embodiments, determination of whether an output is considered to be suspicious may be performed using a machine learning system that receives as input the heuristic processing results. In some implementations, a machine learning system may be configured to iteratively analyze training input data and the input data's corresponding output, and derive functions or models that cause subsequent inputs of results from processing of heuristic (and/or other types of functions/processes) to produce outputs consistent with the machine's learned behavior. In some embodiments, the learning machine system may be implemented based on a neural network system. A neural network includes interconnected processing elements (effectively the systems neurons). The connections between processing elements in the neural network have weights that cause output from one processing element to be weighed before being provided as input to the next interconnected processing elements. The weight values between connections can be varied, thereby enabling the neural network to adapt (or learn) in response to training data it receives. In some embodiments, the learning machine may be implemented as a support vector machine configured to generate, for example, classification functions or general regression functions. In some embodiments, the machine learning system may be implemented using decision trees techniques, regression techniques to derive best-fit curves, hidden Markov models, K-Nearest Neighbors classifiers, and/or other types of machine learning techniques.

A general example process (presented as pseudo code) that includes the various operations performed to identify a circuit, or one or more outputs of a circuit, as potentially malicious is provided below:

| Suspicious Output Wire Identification Process |
|---|
| 1: for all modules m do |
| 2:   for all gates g in m do |
| 3:     for all output wires w of g do |
| 4:       T ← TruthTable(FanInTree(w)) |
| 5:       V ← Empty vector of control values |
| 6:       for all columns c in T do |
| 7:         Compute control of c |
| 8:         Add control(c) to vector V |
| 9:       end for |
| 10:       Compute heuristics for V |
| 11:       Denote w as suspicious or not suspicious based on the processing of V |
| 12:     end for |
| 13:   end for |
| 14: end for |

Thus, in some embodiments of the above general example process, for each module and for each gate in the module, the outputs are examined (outputs may refer to wires that are the outputs of any gate, not just the output pins of a chip or a module). For each output wire, a functional truth table is constructed for the corresponding inputs (e.g., the cone of input wires that feed into the given intermediate output, also called the fan-in tree). Next, for each column, while the other columns are held fixed, a determination is made of whether the values of the column in question affects/determines the output. Mathematically, there are two different logical functions, namely, the function obtained from fixing the input to digital 0 and the function obtained from fixing the input to digital 1. The processing performed by the above general example process enables computation of the Boolean difference between these two functions. As a result, for each input wire, a number between 0 and 1 is derived that represents the fraction of the rows that are influenced or controlled based on the input column. Once this processing is performed for each input, a vector of these controlled numbers is obtained. Heuristics processes (such as those described herein) and/or other processes are applied to these vectors to decide if an output wire is suspicious.

The analysis and procedures described herein are generally performed on a per-module basis. While a hardware backdoor can affect security of operations that happen in multiple modules (e.g., the payload of the backdoor can be spread across different modules), the actual trigger computation usually happens in only one circuit within one module. In some embodiments, modules can be analyzed independently of each other, and thus processing of different modules can be done in parallel for improved scalability.

Performing the various operations described herein may be facilitated by a computing system. Particularly, a system, such as the FANCI system developed at Columbia University, and configured to, for example, identify stealthy malicious logic using, for example, Boolean functional analysis procedures may be realized to implement the procedures and processes described herein. Such a system may be configured to cause operations that include computing for one or more inputs of a circuit (e.g., either part or all of an actual circuit, a computer-based implementation of a circuit, or a design representation of a circuit, such as a schematic, software code representation such as RTL code, etc.) associated metrics representative of degree of influence that values of each of the one or more inputs have on at least one output dependent on the one or more inputs, and determining based, at least in part, on the computed metrics associated with the one or more inputs whether the at least one output dependent on the one or more inputs is part of a potentially malicious implementation.

Figure 4:
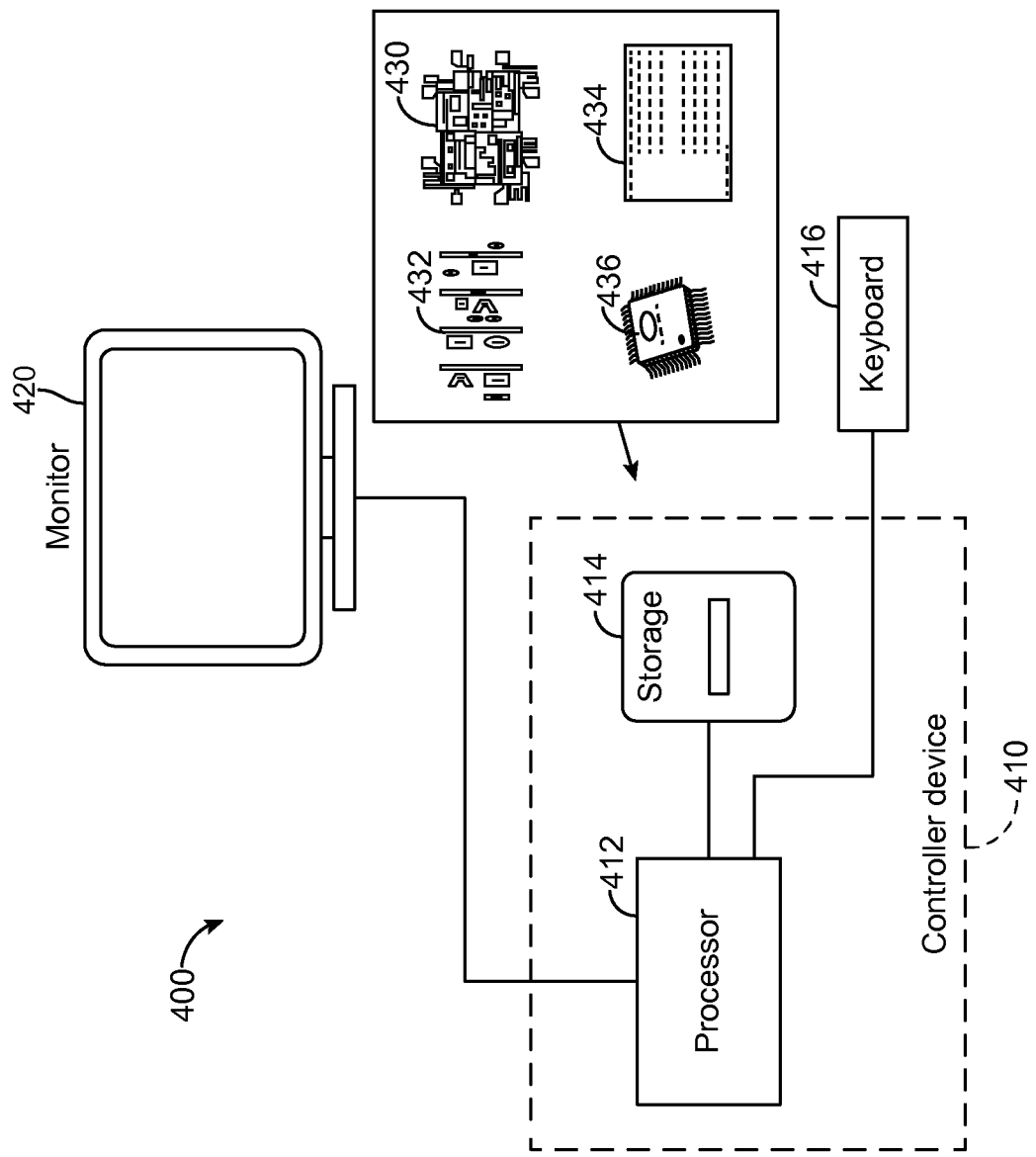
FIG. 4 is a diagram of an example system to identify potential malicious circuit implementations.

Particularly, and with reference to FIG. 4 showing a diagram of an example system 400 to identify potential malicious circuit implementations, the system 400 includes a controller device 410, such as a processor-based personal computer, a specialized computing device, and so forth, that includes, in some implementations, a processor-based unit such as central processor unit (CPU) 412. In some embodiments, the controller device 410 may be realized, at least in part, using modules such as an FPGA (field programmable gate array), an ASIC (application-specific integrated circuit), a DSP processor, etc. In addition to the CPU 412, the system includes main memory, cache memory and bus interface circuits (not shown in FIG. 4). The controller device 410 may include a mass storage element 414, such as a hard drive or flash drive associated with the system. The computing system 400 may further include a keyboard 416, or keypad, or some other user input interface, and a monitor 420, e.g., a CRT (cathode ray tube), LCD (liquid crystal display) monitor, etc., that may be placed where a user can access them.

The controller device 410 is configured to facilitate, for example, the implementation of operations to identify backdoor and/or backdoor triggers through statistical analysis (e.g., Boolean statistical analysis). The storage device 414 may include a computer program product that when executed on, for example, a processor-based implementation of the controller device 410 causes the device to perform operations to facilitate the implementation of procedures and operations to identify backdoor and/or backdoor triggers through statistical analysis. Such operations include computing for one or more inputs of a circuit (which, as noted, may be part or all of an actual circuit, such as example circuits 430 or 436 of FIG. 4, a computer-based implementation or representation of a circuit, such as example circuit representations 432 and 434 of FIG. 4, etc.) associated metrics representative of degree of influence that values of each of the one or more inputs have on at least one output dependent on the one or more inputs. A metric representative of the degree of influence one particular input has on a particular output may include a control value that is representative of a portion of rows of a truth table (generated for the particular circuit output analyzed) whose output values column is influenced by the particular input. The operations also include determining based, at least in part, on the computed metrics associated with the one or more inputs whether the at least one output dependent on the one or more inputs is part of a potentially malicious implementation.

The controller device 410 may further include peripheral devices to enable input/output functionality. Such peripheral devices may include, for example, a CD-ROM drive and/or flash drive (e.g., a removable flash drive), or a network connection (e.g., implemented using a USB port and/or a wireless transceiver), for downloading related content to the connected system. Such peripheral devices may also be used for downloading software containing computer instructions to enable general operation of the respective system/device. As noted, alternatively and/or additionally, in some embodiments, special purpose logic circuitry, e.g., an FPGA (field programmable gate array), an ASIC (application-specific integrated circuit), a DSP processor, etc., may be used in the implementation of the system 400. Other modules that may be included with the controller device 410 are speakers, a sound card, a pointing device, e.g., a mouse or a trackball, by which the user can provide input to the system 400. The controller device 410 may include an operating system, e.g., Windows XP® Microsoft Corporation operating system, Ubuntu operating system, etc.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Some or all of the subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an embodiment of the subject matter described herein), or any combination of such back-end, middleware, or front-end components. The components of the system may be interconnected by any form or medium of digital data communication, e.g., a communication network. Examples of communication networks include a local area network ("LAN"), a wide area network ("WAN"), and the Internet.

The computing system may include clients and servers. A client and server are generally remote from each other and typically interact through a communication network. The relationship of client and server generally arises by virtue of computer programs running on the respective computers and having a client-server relationship to each other.

In some embodiments, any suitable computer readable media can be used for storing instructions for performing the processes/operations/procedures described herein. For example, in some embodiments computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only Memory (EEPROM), etc.), any suitable media that is not fleeting or not devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In order to evaluate the efficacy of the systems and procedures described herein, the FANCI systems developed by Columbia was tested. The system tested included a parser for gate lists that was compiled from a Verilog HDL, which is a popular language for hardware design. The systems, procedures, and concepts described herein, and tested using the FANCI system, could also be applied to VHDL or any other HDL, as well as to hand-written gate lists. Benchmarks from the TrustHub suite, which is a benchmark suite for work on backdoors, was used in the course of testing and evaluations of the systems and procedures described herein. TrustHub is a benchmark suite from an online community of hardware security researchers and includes a variety of different types of backdoors, intended to be state-of-the-art in terms of stealth and effectiveness. For some of these benchmarks, the gate lists were provided, while for other benchmarks the respective gate lists was obtained from the Verilog source using a Synopsys tool chain.

Based on the gate lists, circuit representations can be derived in order to calculate different types of dependencies. In some embodiments, this can be performed by pre-processing the gate lists to tokenize all of the different types and keywords. Statements in a gate list include a declaration of wires, an assignment action(s), and the definition of a gate or small set of gates. Multiple-bit wires are generally treated as sets of independent wires (this has the effect of declaring each bit as its own wire). Gates that represent multiple basic logic functions—such as an AND-OR-INVERTER (AOI)—are broken down into their basic elements to make analysis easier. Memory elements (e.g., flip-flops) were treated as their logical equivalents. For example, a D-flip-flop was treated as an identity function.

In the course of evaluating the efficacy of the systems and procedures described herein, the four heuristics discussed above, namely, the mean, medium, triviality and the conjunction of median and mean heuristics, were implemented and tested on the TrustHub benchmarks. In the conjunction case, only those wires that had both a suspiciously low mean and a suspiciously low median were flagged. In the tests, one run was performed with $2^{15}=32,768$ input cases (truth table row pairs), with the inputs chosen uniformly at random. An important result of the testing was that no false negatives were encountered for any of the four heuristics. For every benchmark and for each of the four metrics, at least one suspicious wire from each backdoor was discovered. Interestingly, different metrics tend to highlight different parts of the backdoor. In general, the mean and median tend to highlight backdoor payload wires and are similar to each other. This is likely because these payloads have triggers or resulting values from triggers as their inputs. Thus, several of the input wires have low control values, causing both the mean and median to be small.

On the other hand, the triviality heuristic process results focus more on the output wires, and as such tend to highlight backdoor trigger wires. Since these are wires that are nearly always not set and only in rare circumstances get set, their truth tables tend to score low for triviality.

During the testing and evaluation conducted, it was found that typically a wire that was flagged for the mean or median was a backdoor payload, while a wire that is flagged for triviality was backdoor trigger. For each backdoor, at least one trigger and one payload wire were identified, which is why either metric is likely sufficient to avoid false negatives. However, using both metrics can help out in code review by flagging most or all of the wires associated with the backdoor, and thus demarcating the backdoor more clearly.

Figure 5:
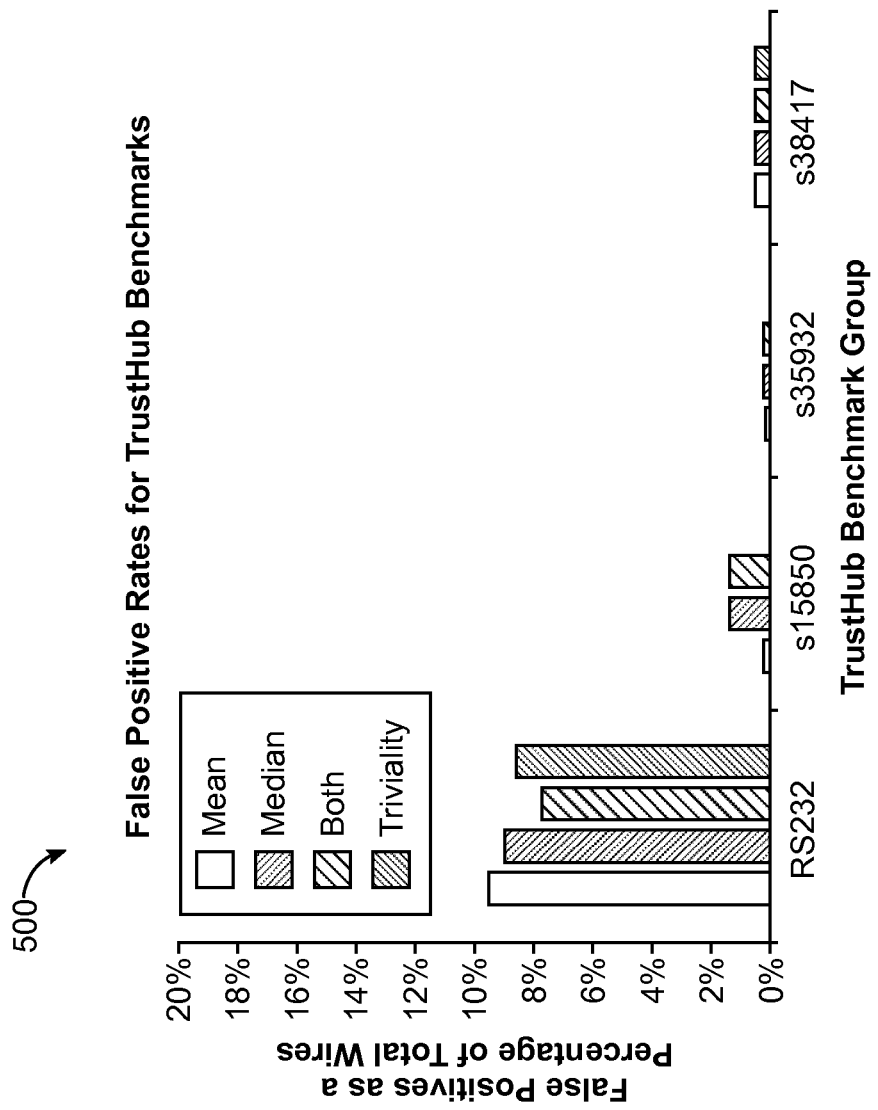
FIG. 5 is a graph showing example results for generation of false positive for various benchmarks processed so as to detect malicious circuit implementations.

With reference to FIG. 5, a graph 500 showing the results for the eighteen (18) TrustHub benchmarks that were analyzed with respect to generation of false positives is provided. In the results, the benchmarks were categorized into groups used by TrustHub. These categories represent four different design types, chosen to be part of the benchmark suite and containing a variety of backdoor triggering mechanisms. Each of the four groups contains a variety of backdoors manually included into a given design. The RS232 group contains eleven benchmarks, representing eleven different backdoors applied to a relatively small third-party UART controller. The S35932 and S38417 groups each contain three benchmarks, containing backdoors built into two gate lists whose source and description are not provided. The S15850 group contains only one benchmark, namely, a gate list without source or functional description. The S38417 group contains the largest designs in terms of area and number of gates. The RS232 benchmarks mostly contain sequential (state-machine based) triggers but also a few combinational triggers. The s15850, s35932, and s38417 categories are more different than the RS232 category, and more similar to each other. The s15850, s35932, and s38417 categories contain mostly, but not only, combinational triggers and are larger than the RS232 set. The results indicated that the RS232 group has a false positive rate of around 8%, while the other groups have lower rates (e.g., less than 1/%).

The results, as also shown in FIG. 5, show a decrease in the false positive percentage for larger designs. This can be attributed to the fact that the total number of false positives remained roughly constant with respect to design size. Additionally, the different benchmark categories achieve differing degrees of stealth. Most of the triggers in the RS232 category have a relatively high probability (e.g., 1:1,000,000), corresponding to low stealth of going off randomly (such as during validation). In the other categories, the probabilities are lower, ranging from one in several million to as low as around one in $2^{150}$. The backdoors in the three low probability groups are the most realistic, since they are stealthy enough to evade detection by normal methods. The backdoors in the RS232 category may go off with such high probability that validation testing would have a good chance of finding them. It was empirically observed that the larger the design and the more well-hidden the backdoor, the better the tested system (e.g., the FANCI system) performs in terms of keeping false positive rates low. False positives mean increased effort for security engineers. Once a wire is flagged as suspicious, a security engineer generally would need to look at the code and see if there is a good reason for that circuit to be there. If, for example, there are 1% false positives, that would mean roughly 1% of the design would require detailed code review.

FIG. 5 also shows the breakdown of false positives for different heuristics. As can be seen, using the median heuristic by itself generally produced the most false positives on average. However, the difference is not large. Generally, all four metrics are effective enough for practical use. Other metrics and/or heuristic processes (and/or other types of processes) may also be used that could achieve further improvements in terms of false positive rates.

Figure 6:
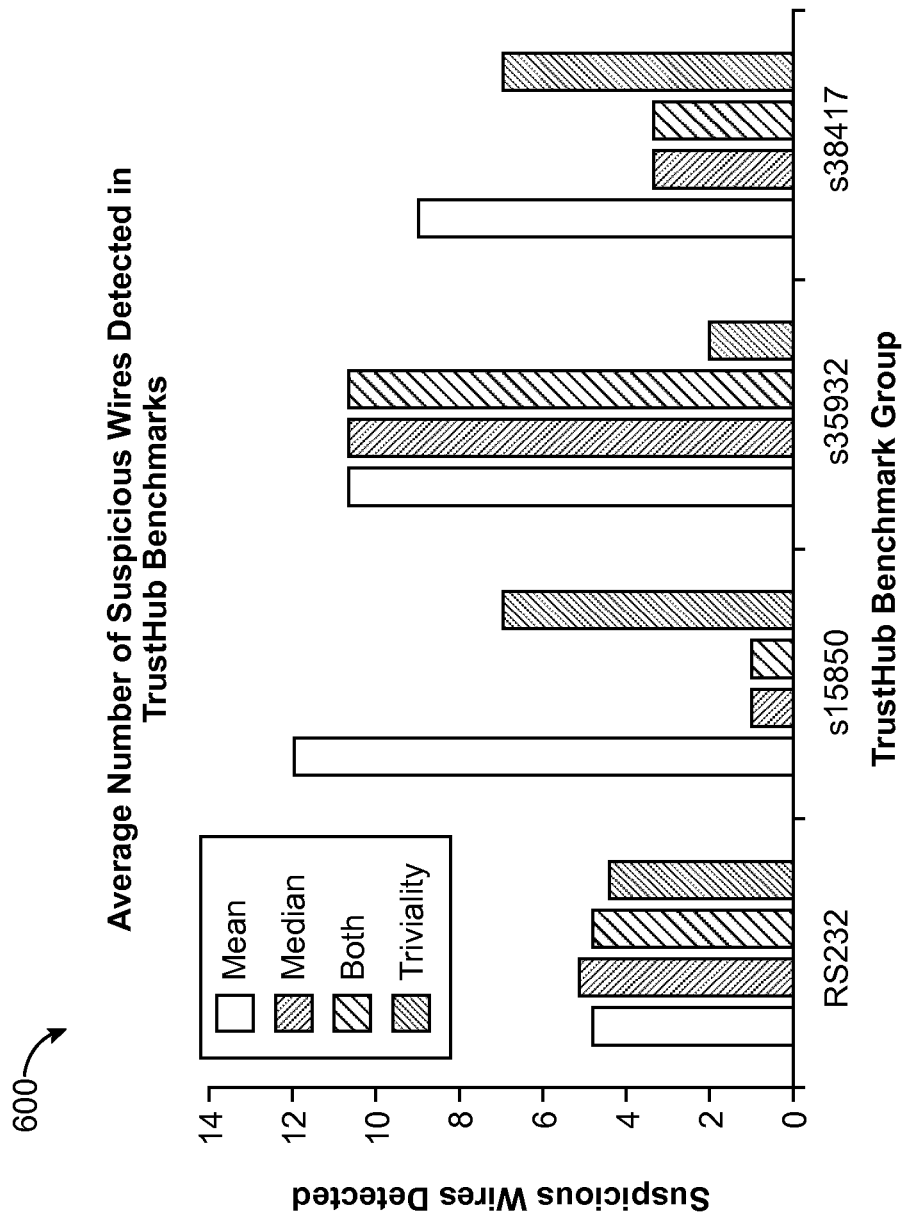
FIG. 6 is an example graph showing an average number of wires flagged as suspicious for each of various benchmark groups, and by each of the different metrics, for malicious circuit detection processes.

FIG. 6 includes a graph 600 showing the average number of wires that were flagged as suspicious for each of the benchmark groups, by each of the different metrics. Each of the four metrics considered generally worked well, but, in the testing conducted, the mean process turned up the most suspicious wires (at the cost of slightly higher false positive rates). For the four metrics considered, only a small number of wires were flagged as suspicious, which means technician/security engineers would be provided with a relatively small set of potential malicious implementations that would need to be further inspected/investigated. For most of the groups, the FANCI system whitelisted more than 99% of the designs, rendering further circuit/code review and inspection a feasible task.

Figure 7:
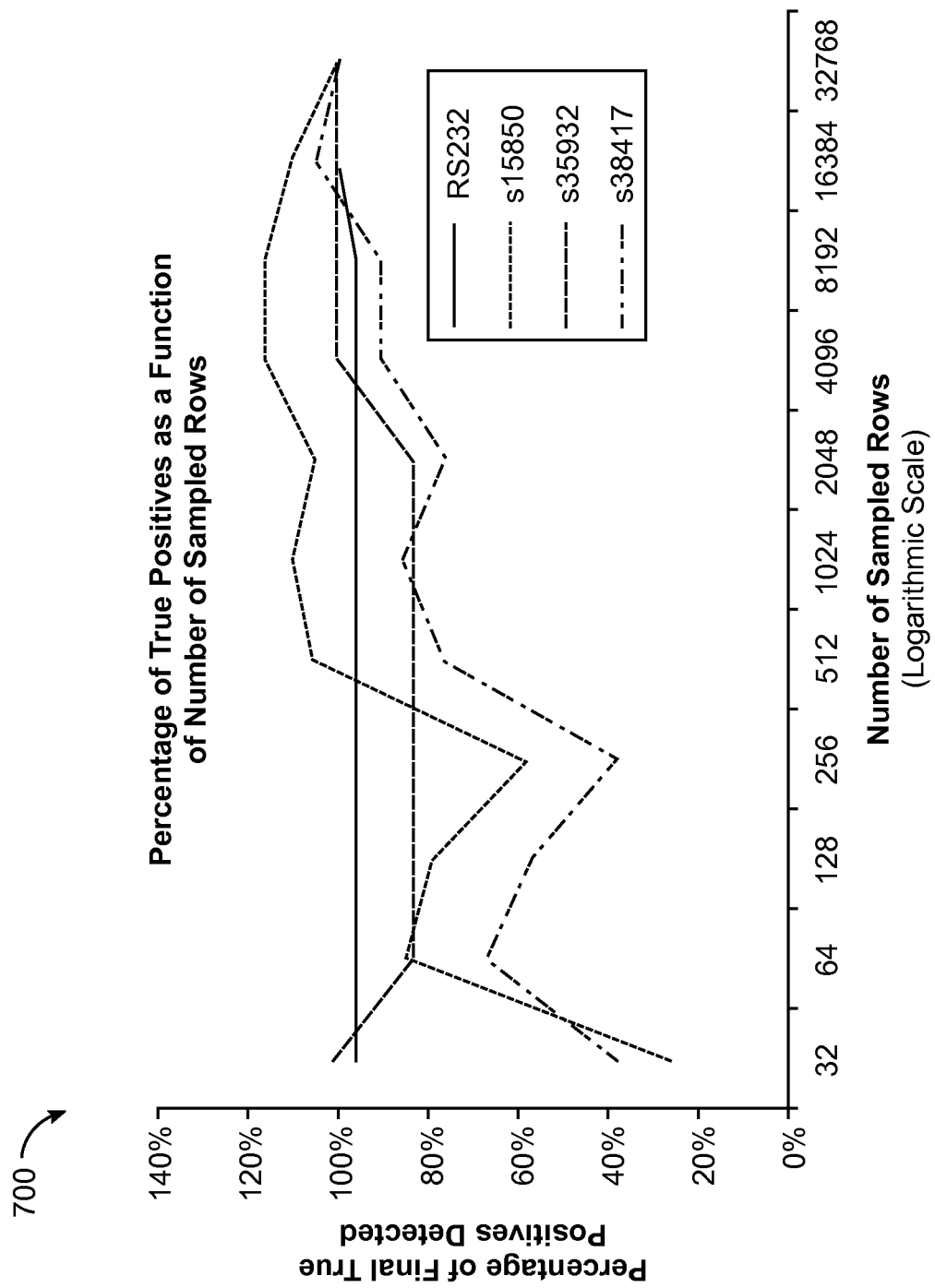
FIG. 7 is an example graph illustrating tradeoff between runtime for malicious circuit detection processes and the rate of true-positives identification.

The evaluation/testing of the implementations and procedures described herein also included determining what happens as the number of input rows being sampled increases or decreases. With reference to FIG. 7, a graph 700 illustrating the tradeoff between the runtime (in terms of the input sampled tested, indicated on a logarithmic-scale x-axis) and the rate of true-positives identification is provided. As shown in the graph 700, increasing the number of input testing improves, up to the point, the true-positive rate. Beyond that point, the results tend to converge and stay about the same. It is to be noted that due to randomness, sometimes more values are flagged using fewer inputs. This generally does not affect results significantly because the true positives tend to be clustered in the design, so adding or removing one wire generally does not make a large difference in code review. There are generally two sources of false positives. The first source is the nature of the approximation used. Particularly, running only a few inputs tended to result in a larger number of false positives, and running a few more inputs resulted in fewer false positives. The second source of false positives is from unavoidable false positives, e.g., weakly-affecting signals that are in the design for legitimate reasons.

As FIG. 7 shows, the rate of true positive (as a percentage) tends to plateau relatively quickly, which is why false positives generated due to approximation (e.g., from testing a limited subset of input rows) are not a major concern. As the number of randomly chosen inputs is increased, the probability that the approximation converges toward the best answer increases. This best answer may not be perfect, but as the results show it is generally quite good. However, beyond a certain point there is not much benefit to computing more rows in the truth table.

The evaluation for the systems and procedures described herein also considered the evaluation runtime. In the example of the FANCI implementation, it was determined that the runtime was roughly proportional to the size of the design/implementation being tested in terms of number of total gates. In practice, the runtime ranges from a few minutes to about an hour when using $2^{15}$ rows per truth table. The runtime can be increased or decreased by changing the number of inputs tested. In practice, it was determined that it was not necessary to decrease this number. Given the sizes of third-party IP components on the market, the runtime for FANCI (for example) should not be a problem for real-world scenarios. Particularly, the asymptotic runtime for a deterministic process would be in the set $O(nd2^d)$ where n is the number of gates (or nodes) and d is the maximal degree of a node, i.e., the maximal number of inputs on which an intermediate wire can depend. Using approximate truth tables reduces the asymptotic runtime to the set $O(nd)$. Making the (usually correct) assumption that the degree is small and bounded, this reduces to the set $O(n)$, which represents linear runtime. It is to be noted that inputs are generally chosen uniformly at random. It is also to be noted that the procedures described herein are parallelizable.

The evaluation of the implementations/procedures described herein indicated that false positives tend to be systemic and consistent, and generally do not occur due to the randomness of the sampling methods used. In fact, sampling runs used in the evaluations conducted returned fairly consistent results. The false positives that occurred generally corresponded to wires that were weakly-affecting but not part of a malicious backdoor implementation. Some examples of benign weakly-affecting wires include the most significant bit of a large counter, an input to an exception recognition circuit for a particularly unusual exception, etc. Such circuits are semantically similar to backdoors, because they react to one specific rare case. For example, consider a situation of a floating point divider that throws only a single exception, caused by a divide-by-zero error. For the data input representing the divisor, only the value zero invokes the exception-handling logic. Thus, the exception-handling logic is nearly unused, and accordingly input is a weakly-affecting input. Qualitatively, the existence of these circuits should not pose much of a problem, because counters and exceptions are relatively easily recognizable in code review. Nevertheless, an attacker might be motivated to include many such circuits to increase the false positive count. However, from the attacker's point of view, the problem is that each of these false positives requires a costly circuit, and so building an entire circuit implementation this way would generally be impractical. Additionally, these types of circuits in practice tend to have clear architectural purposes (e.g., to conceal the existence of actual backdoor implementations), so adding thousands of them would be an indication that the circuit is highly suspicious. For example, including a large number of exception handlers that serve no apparent purpose would be a source of concern (e.g., during code inspection). It is to be noted that the evaluation indicated that the number of false positives tends to diminish (as a percentage) when larger designs are considered. In other words, scaling up to larger designs does not seem to greatly increase the total number of false positives.

In order to study the implementations and procedures described herein on larger and backdoor-free circuits, a FabScalar microprocessor core generation tool was used. FabScalar is an HDL code generator that produces processor cores given a fixed set of parameters. The particular core uses in the evaluation was a moderately-sized, out-of-order core with four execution units that did not contain backdoors. The core analyzed had a total of 56 modules, each containing, on the average, about 1900 distinct wires, with the largest module containing slightly over 39,000 wires. While the overall design was larger than any of the modules from the TrustHub suite, and larger than typical third-party IP components, the individual modules were, on average, around the same size as modules in the TrustHub suite. During the testing performed using the FabScalar microprocessor core, modules were analyzed using $2^{15}$ row pair samples per truth table. As expected, no false positives were detected in the benign FabScalar core.

Figure 8:
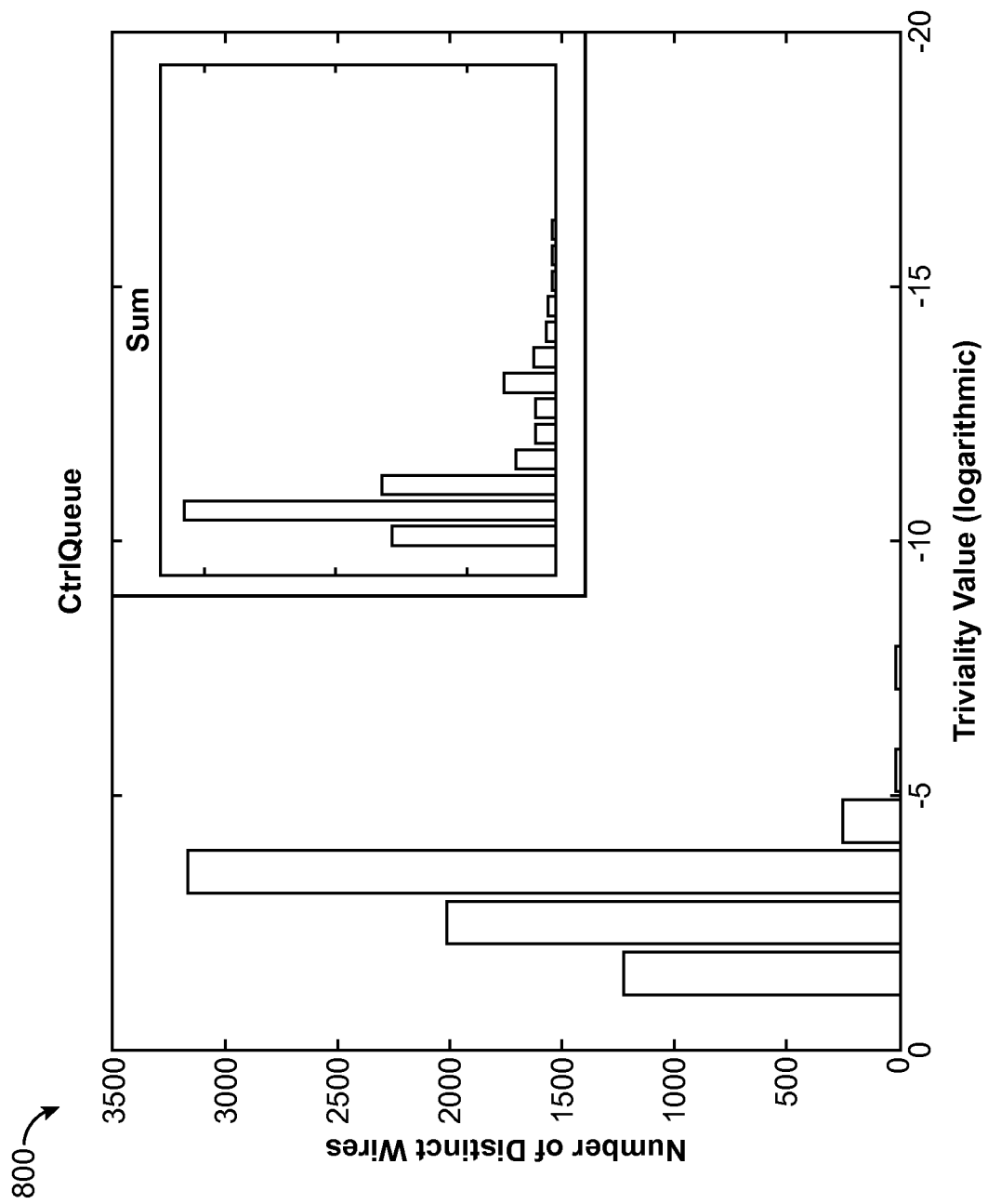
FIG. 8 is a graph of an example histogram of triviality values derived for wires in an example circuit.

With reference to FIG. 8, a graph 800 of an example histogram of triviality values for wires in a typical FabScalar module called CtrlQueue is provided. As shown, there are spikes at the values of 0.5, 0.25, and 0.125. The spikes in the histogram were generated because semantically similar wires tend to have similar values (as had occurred in the example of the multiplexer). In this example, there were no suspicious outliers, with all of the values being at least 0.01, and no more than 0.99.

Figure 9:
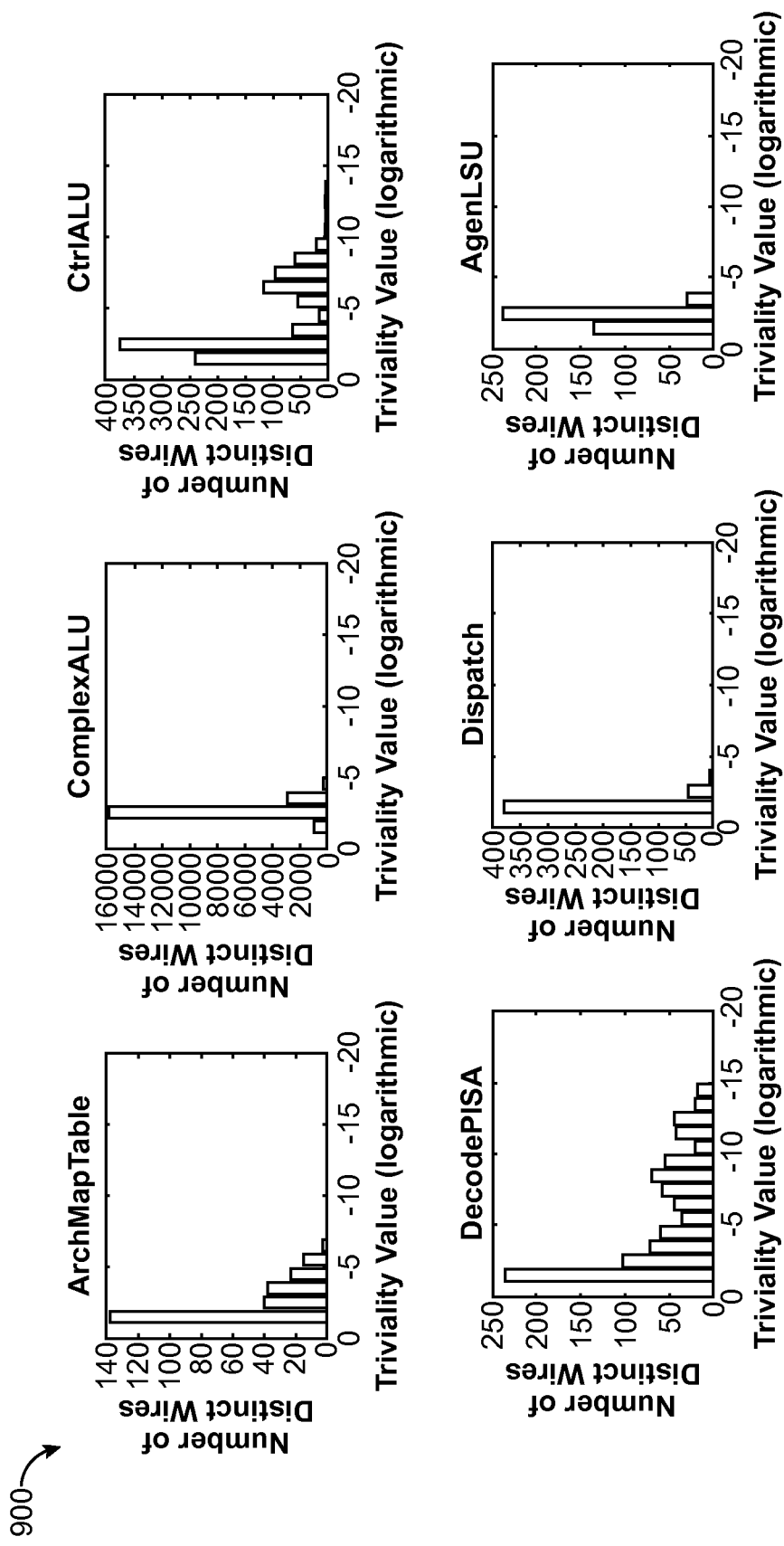
FIG. 9 are graphs of example histograms of triviality values for wires in six modules for a FabScalar example circuit.

FIG. 9 illustrate example histograms 900 of the triviality values found for wires in six modules of FabScalar. In a normal design, most of the wires have values that are not extremely small, with values between ⅛ and ½ being common. To make the results easier to read, the values between zero and ½ were combined with the values between ½ and 1. For example, 0.1 and 0.9 are plotted together, as are 0.7 and 0.3. To use the example of the DecodePISA module, which experienced slightly lower triviality values than the other example modules, it turned out that most of the lower values belong to higher order bits of a 128-bit output packet called DecodedPacket0. Without knowing the intention of the original designer, it seems likely that these upper order bits are not always being used efficiently. However, the control values are not so low as to merit real suspicion. In addition to serving as a security method, these types of observations may also be useful for regular debugging and optimization by trusted designers. As can also be sees in the histograms, the majority of wires are bunched up on the left side, having relatively normal values (closer to ½ then to the extremes of zero or one). In FabScalar, it is rare to encounter wires with values less than $2^{-10}$ (which is still considered to be a relatively benign value, corresponding to roughly a one in one thousand chance of a certain behavior occurring). While the values are mostly close to $2^{-1}=½$, the actual distributions vary from module to module. This is to be expected, as module implementations are complex, and it is rare for two different modules to be exactly the same.

Thus, as discussed herein, the implementations and procedures disclosed herein rely on the fact that backdoors use weakly-affecting wires (because backdoors need to be stealthy, e.g., well-hidden from validation testing). Generally, the more a backdoor is hidden, the more likely it is to be caught by the systems, procedures and other implementations described herein, because more well-hidden backdoors generally result in lower control values. On the other hand, the less well-hidden a backdoor is, the more likely it is to evade the systems, procedures and other implementations described herein. However, less well-hidden backdoors are more easily caught by standard validation practices. For example, a poorly-hidden backdoor that turns on frequently (and thus has high control values) might, under some situations (but not necessarily) go unnoticed by the systems and procedures described herein, but on the other hand would likely be caught during other types of validation testing (such an attack is called "Frequent-Action Backdoor," where the idea is to put the backdoor in plain sight). Generally, a fixed-length combinational circuit path, achieving a given level of stealth, requires a correspondingly low control value for one or more of its inputs.

As further discussed, the implementations and procedures described herein generally do not remove the need for standard code inspection/review practices. Consider for example an attack where a malicious designer includes thousands of backdoor-like circuits. Each of these circuits could turn on given a variety of rare triggers, with only one of them having a useful payload. Under these circumstances, the implementations and procedures described herein might flag many (or even all) of these backdoor circuits, mostly generating false positives. However, as noted, aside from the fact that such a large number of circuits would increase the size requirements of the global circuit arrangement, this large number of circuits within the global circuit would, upon a brief code inspection by security engineers/technicians, be a clear indication of a potentially malicious design.

Functional analysis alone might not protect against backdoors inserted physically into a device by a malicious foundry, unless a functional representation can be reverse engineered from the device (e.g., via decapping). These types of attacks are called "Physical" or "Parametric" backdoor attacks. Functional analysis is one part of a hardware security strategy that typically would also include validation, code inspection, foundry-level techniques, etc.

The procedures described herein work well against sequential backdoors but with limitations. In some embodiments, sequential backdoors are trigged by a stream of small inputs over time. In other words, they are triggered by the combination of an input and a specific internal state. Hypothetically, a sequential backdoor that makes use of an extremely large and a deep state machine might be able to evade detection, or at least make detection more difficult (this type of attack is referred to as a "Pathological Pipeline Backdoor" attack). The idea is that by stretching out the backdoor trigger computation over a long stretch of logic, it makes the control value data more noisy and potentially more difficult to interpret. For example, if an input needs to determine an ultimate output with $1/2^{32}$ probability, this can be done with two sequential components, each with a probability of $1/2^{16}$ of turning on. The control value from beginning to end will still be $1/2^{32}$, but there will be many intermediate control values, and the overall metrics might not be as clean. Because standard validation and detection tests/procedures are configured to catch an extremely large backdoor, and the procedures described herein are configured to detect smaller, well-hidden, backdoors, this example illustrates one situation how the procedures described herein could be used in conjunction with other validation practices.

Although particular embodiments have been disclosed herein in detail, this has been done by way of example for purposes of illustration only, and is not intended to be limiting with respect to the scope of the appended claims, which follow. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A method comprising:
   computing for one or more inputs of a circuit associated one or more metrics representative of a degree of influence that values of each of the one or more inputs have on at least one output dependent on the one or more inputs, wherein computing for the one or more inputs of the circuit the associated one or more metrics comprises:
   generating a truth table for the one or more inputs and the at least one output dependent on the one or more inputs, the truth table including at least some combinations of respective input values for the one or more inputs and resultant values of the at least one output dependent on the one or more inputs; and computing for at least one of the one or more inputs, based on the generated truth table, an associated at least one control value representative of a portion of rows of the truth table whose output is influenced by the at least one of the one or more inputs; and determining based, at least in part, on the computed one or more metrics associated with the one or more inputs whether the at least one output dependent on the one or more inputs is part of a potentially malicious implementation.

2. The method of claim 1, wherein determining based, at least in part, on the computed one or more metrics associated with the one or more inputs whether the at least one output dependent on the one or more inputs is part of a potentially malicious implementation comprises:

identifying from the one or more inputs, from which the at least one output is dependent, at least one malicious triggering input configured to trigger malicious behavior of the potentially malicious implementation.

3. The method of claim 1, wherein the potentially malicious implementation comprises a potential electronic backdoor implementation.

4. The method of claim 1, wherein generating the truth table comprises:

evaluating a random-size subset of possible permutations of the input values for the one or more inputs and the resultant output values of the at least one output dependent on the one or more inputs.

5. The method of claim 1, wherein determining based, at least in part, on the computed one or more metrics associated with the one or more inputs whether the at least one output dependent on the one or more inputs is part of a potentially malicious implementation comprises:

determining whether the at least one output dependent on the one or more inputs is part of a potentially malicious implementation based on application of one or more heuristics to the at least one control value computed from the truth table.

6. The method of claim 5, wherein determining whether the at least one output dependent on the one or more inputs is part of a potentially malicious implementation based the on the application of the one or more heuristics to the at least one control value computed from the truth table comprises:

applying to the at least one control value one or more of: a median heuristic process to select a median value from the at least one control value, a mean heuristic process to compute a mean value from the at least one control value, or a triviality heuristic process to compute a weighted average value from the at least one control value.

7. The method of claim 5, further comprising:

comparing one or more resultant values respectively computed from the application of the one or more heuristics to the at least one control value to respective one or more predetermined threshold values.

8. The method of claim 1, wherein the circuit comprises one or more of: a physical electrical circuit, a software-implemented circuit, a graphical circuit representation, or a coded circuit representation.

9. The method of claim 1, wherein the circuit includes a circuit module of a circuit arrangement comprising multiple circuit modules.

10. The method of claim 1, wherein the at least one output dependent on the one or more inputs comprises one or more of: an output of the circuit, or an intermediate output within the circuit.

11. The method of claim 1, wherein the circuit comprises one or more of: a microprocessor, a digital signal processor, a memory controller, a micro-controller, a network controller, a display controller, a graphic core, a bus interface, a cryptographic unit, a decoder, an encoder, a content addressable memory (CAM), or a memory block.

12. A system comprising:

at least one controller comprising one or more of a processor-based device, a field programmable gate array (FPGA), an application-specific integrated circuit (ASIC) device, or a digital signal processor (DSP) processor, the controller configured to cause operations comprising:

computing for one or more inputs of a circuit associated one or more metrics representative of a degree of influence that values of each of the one or more inputs have on at least one output dependent on the one or more inputs, wherein computing for the one or more inputs of the circuit the associated one or more metrics comprises:

generating a truth table for the one or more inputs and the at least one output dependent on the one or more inputs, the truth table including at least some combinations of respective input values for the one or more inputs and resultant values of the at least one output dependent on the one or more inputs; and computing for at least one of the one or more inputs, based on the generated truth table, an associated at least one control value representative of a portion of rows of the truth table whose output is influenced by the at least one of the one or more inputs; and determining based, at least in part, on the computed one or more metrics associated with the one or more inputs whether, the at least one output dependent on the one or more inputs is part of a potentially malicious implementation.

13. The system of claim 12, wherein determining based, at least in part, on the computed one or more metrics associated with the one or more inputs whether the at least one output dependent on the one or more inputs is part of a potentially malicious implementation comprises: identifying from the one or more inputs, from which the at least one output is dependent, at least one malicious triggering input configured to trigger malicious behavior of the potentially malicious implementation.

14. The system of claim 12, wherein generating the truth table comprises:

evaluating a random-size subset of possible permutations of the input values for the one or more inputs and the resultant output values of the at least one output dependent on the one or more inputs.

15. The system of claim 12, wherein determining based, at least in part, on the computed one or more metrics associated with the one or more inputs whether the at least one output dependent on the one or more inputs is part of a potentially malicious implementation comprises:

determining whether the at least one output dependent on the one or more inputs is part of a potentially malicious implementation based on application of one or more heuristics to the at least one control value computed from the truth table.

16. A non-transitory computer readable medium programmed with a set of instructions executable on at least one controller device that, when executed, causes operations comprising:

computing for one or more inputs of a circuit associated one or more metrics representative of a degree of influence that values of each of the one or more inputs have on at least one output dependent on the one or more inputs, wherein computing for the one or more inputs of the circuit the associated one or more metrics comprises:
generating a truth table for the one or more inputs and the at least one output dependent on the one or more inputs, the truth table including at least some combinations of respective input values for the one or more inputs and resultant values of the at least one output dependent on the one or more inputs; and
computing for at least one of the one or more inputs, based on the generated truth table, an associated at least one control value representative of a portion of rows of the truth table whose output is influenced by the at least one of the one or more inputs; and
determining based, at least in part, on the computed one or more metrics associated with the one or more inputs, whether the at least one output dependent on the one or more inputs is part of a potentially malicious implementation.

17. The computer readable medium of claim 16, wherein determining based, at least in part, on the computed one or more metrics associated with the one or more inputs whether the at least one output dependent on the one or more inputs is part of a potentially malicious implementation comprises:
identifying from the one or more inputs, from which the at least one output is dependent, at least one malicious triggering input configured to trigger malicious behavior of the potentially malicious implementation.

18. The computer readable medium of claim 16, wherein generating the truth table comprises:
evaluating a random-size subset of possible permutations of the input values for the one or more inputs and the resultant output values of the at least one output dependent on the one or more inputs.

19. The computer readable medium of claim 16, wherein determining based, at least in part, on the computed one or more metrics associated with the one or more inputs whether the at least one output dependent on the one or more inputs is part of a potentially malicious implementation comprises:
determining whether the at least one output dependent on the one or more inputs is part of a potentially malicious implementation based on application of one or more heuristics to the at least one control value computed from the truth table.

* * * * *